US012640508B2

(12) United States Patent
Fu et al.

(10) Patent No.: US 12,640,508 B2

(45) Date of Patent: May 26, 2026

(54) CONDUCTIVE TERMINAL AND ELECTRICAL CONNECTION ASSEMBLY

(71) Applicant: Tyco Electronics (Shanghai) Co., Ltd., Shanghai (CN)

(72) Inventors: Xiaozhi (George) Fu, Shanghai (CN); Wei Zhang, Shanghai (CN); Dingbing (Frank) Fan, Shanghai (CN); Wei (Rock) Lv, Shanghai (CN)

(73) Assignee: Tyco Electronics (Shanghai) Co., Ltd., Shanghai (CN)

( * ) Notice: Subject to any disclaimer, the term of this patent is extended or adjusted under 35 U.S.C. 154(b) by 351 days.

(21) Appl. No.: 18/335,546

(22) Filed: Jun. 15, 2023

(65) Prior Publication Data

US 2023/0411885 A1 Dec. 21, 2023

(30) Foreign Application Priority Data

Jun. 15, 2022 (CN) ......................... 202221498931.5

(51) Int. Cl.

| | |
|---|---|
| ***H01R 12/91*** | (2011.01) |
| ***H01R 4/48*** | (2006.01) |
| ***H01R 12/58*** | (2011.01) |

(52) U.S. Cl.

CPC ........... *H01R 12/91* (2013.01); *H01R 4/4823* (2023.08); *H01R 4/4826* (2023.08); *H01R 12/58* (2013.01)

(58) Field of Classification Search

CPC ........ H01R 12/58; H01R 12/91; H01R 12/55; H01R 4/4823; H01R 4/4826; H01R 4/58; H01R 4/48; H05K 1/02

See application file for complete search history.

(56) References Cited

U.S. PATENT DOCUMENTS

| | | | | |
|---|---|---|---|---|
| 7,354,279 | B2 * | 4/2008 | Uesaka | H01R 13/41 439/74 |
| 9,088,113 | B2 * | 7/2015 | Funayama | H01R 13/6315 |
| 2016/0120024 | A1 * | 4/2016 | Oguro | H01R 12/57 174/250 |
| 2016/0197418 | A1 * | 7/2016 | Feye-Hohmann | H01R 4/4848 439/861 |
| 2022/0069493 | A1 * | 3/2022 | Kobayashi | H01R 12/7005 |

* cited by examiner

*Primary Examiner* — Tulsidas C Patel
*Assistant Examiner* — Carlos E Lopez-Pagan
(74) *Attorney, Agent, or Firm* — Barley Snyder

(57) ABSTRACT

A conductive terminal includes a fixing portion mechanically fixing and electrically connecting to a circuit board, a floating portion elastically connected to the fixing portion and capable of moving relative to the fixing portion, and an elastic clip connected to the floating portion and having a clamping portion clamping and electrically contacting a mating terminal inserted into the clamping portion. The floating portion is movable under a drive of the mating terminal when the mating terminal is inserted offset into the clamping portion to adjust the clamping portion to a position aligned with the mating terminal.

20 Claims, 6 Drawing Sheets

CONDUCTIVE TERMINAL AND ELECTRICAL CONNECTION ASSEMBLY

CROSS-REFERENCE TO RELATED APPLICATION

This application claims the benefit of the filing date under 35 U.S.C. § 119(a)-(d) of Chinese Patent Application No. 202221498931.5, filed on Jun. 15, 2022.

FIELD OF THE INVENTION

The present invention relates to a conductive terminal and an electrical connection assembly comprising the conductive terminal.

BACKGROUND

In order to ensure reliable electrical contact between a conductive terminal and an inserted mating terminal, the mating terminal must be aligned with a clamping portion of the conductive terminal. If the mating terminal is offset from the clamping portion of the conductive terminal, electrical contact may be unreliable. In a vibration environment, it can lead to a transient disconnection problem between the mating terminal and the conductive terminal.

SUMMARY

A conductive terminal includes a fixing portion mechanically fixing and electrically connecting to a circuit board, a floating portion elastically connected to the fixing portion and capable of moving relative to the fixing portion, and an elastic clip connected to the floating portion and having a clamping portion clamping and electrically contacting a mating terminal inserted into the clamping portion. The floating portion is movable under a drive of the mating terminal when the mating terminal is inserted offset into the clamping portion to adjust the clamping portion to a position aligned with the mating terminal.

BRIEF DESCRIPTION OF THE DRAWINGS

Features of the present invention will become more apparent by describing in detail exemplary embodiments thereof with reference to the accompanying drawings, in which.

DETAILED DESCRIPTION OF EMBODIMENTS OF THE INVENTION

Figure 1:
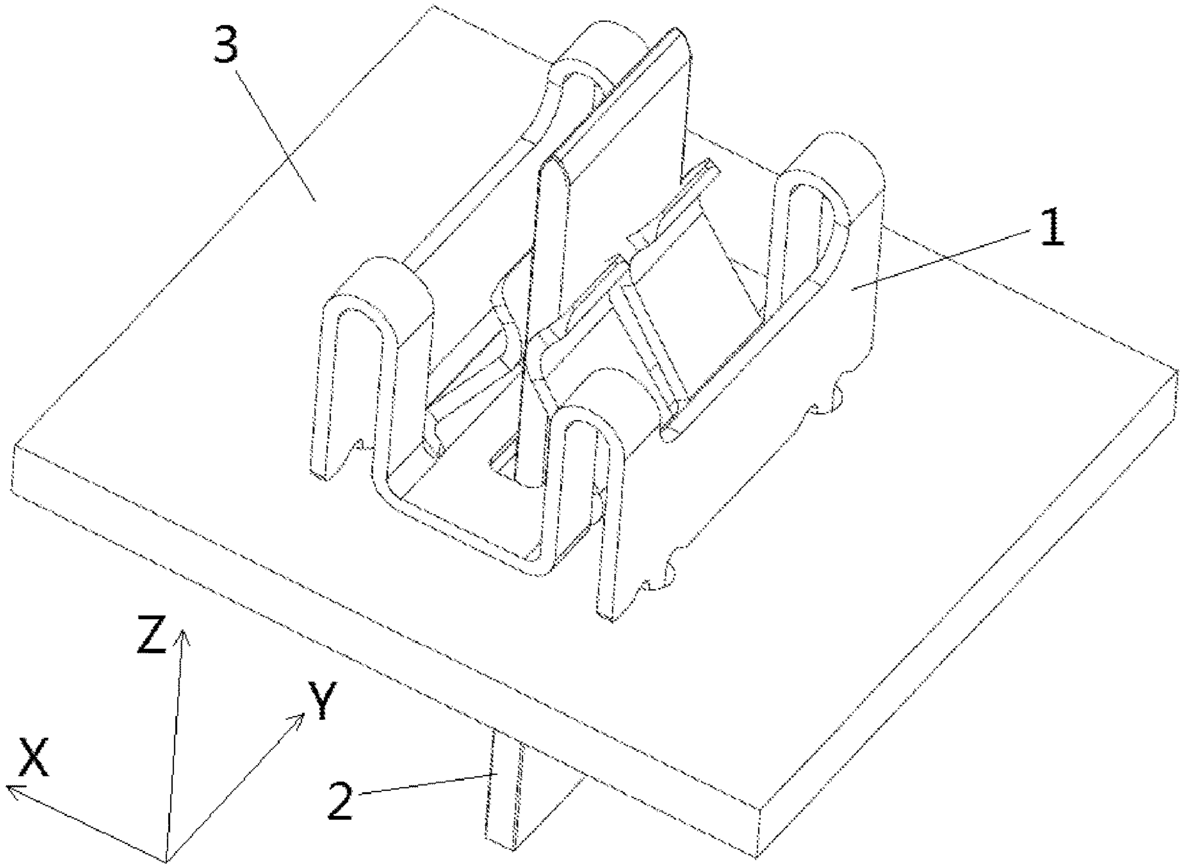
FIG. 1 is a perspective view of an electrical connection assembly according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

As shown in FIG. 1, in the illustrated embodiment, the electrical connection assembly mainly includes a conductive terminal 1, a mating terminal 2, and a circuit board 3. The conductive terminal 1 is fixedly installed on the circuit board 3, and the mating terminal 2 is inserted into a clamping portion **13*a* of the conductive terminal 1, shown in FIG. 2, and electrically contacts the clamping portion 13*a* of the conductive terminal 1**.

Figure 2:
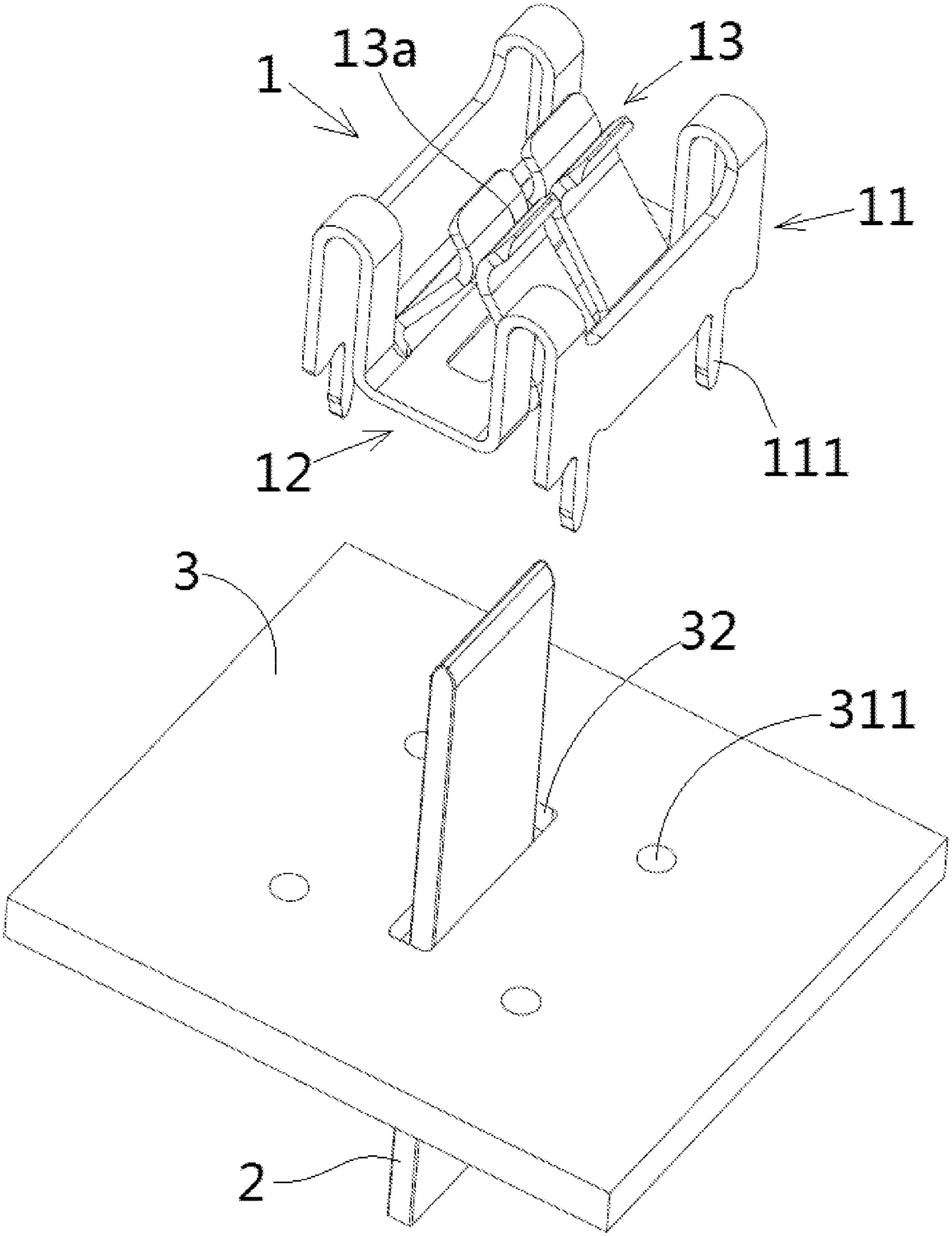
FIG. 2 is an exploded perspective view of the electrical connection assembly.
Figure 3:
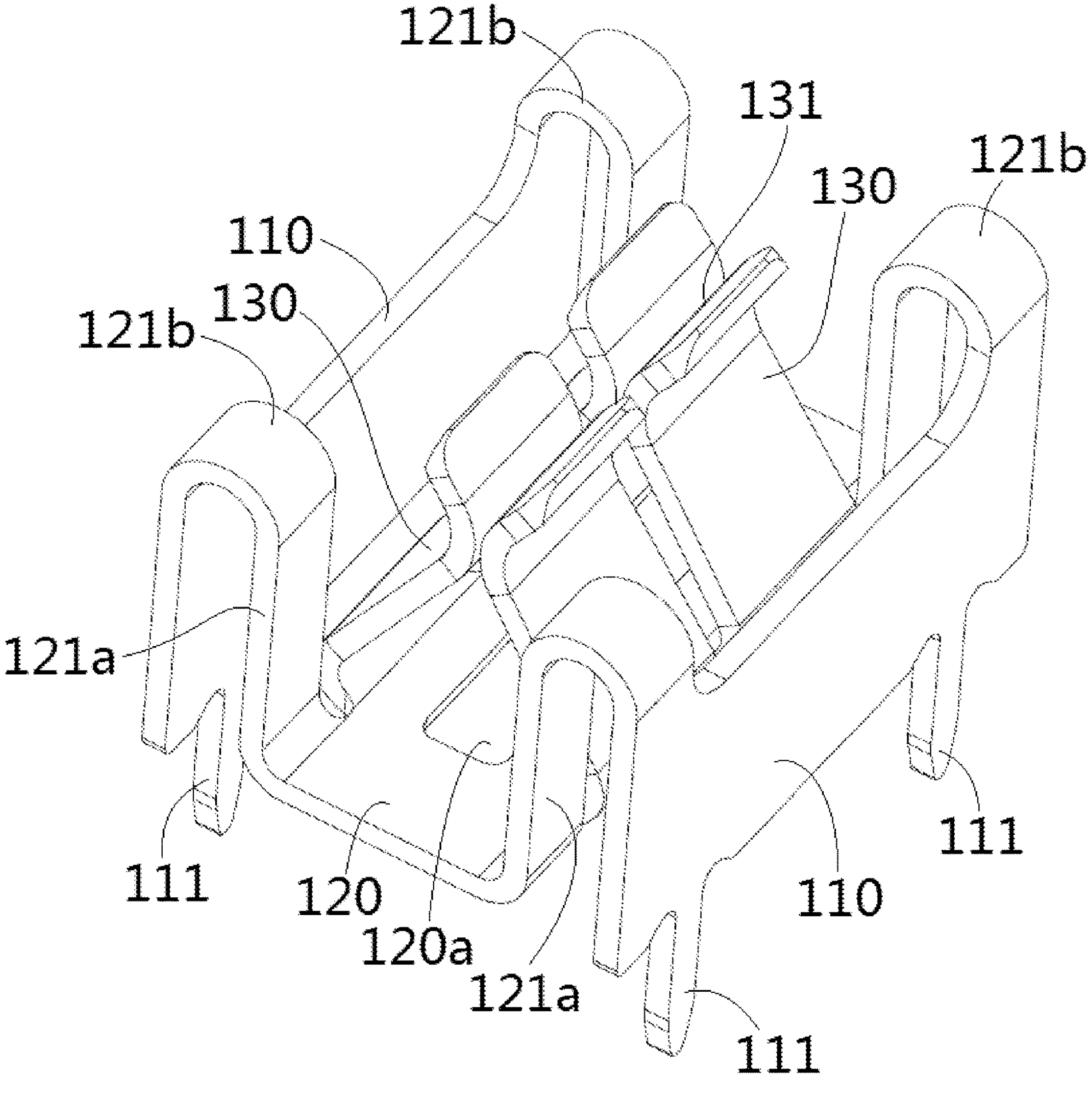
FIG. 3 is a perspective view of a conductive terminal according to an embodiment.
Figure 4:
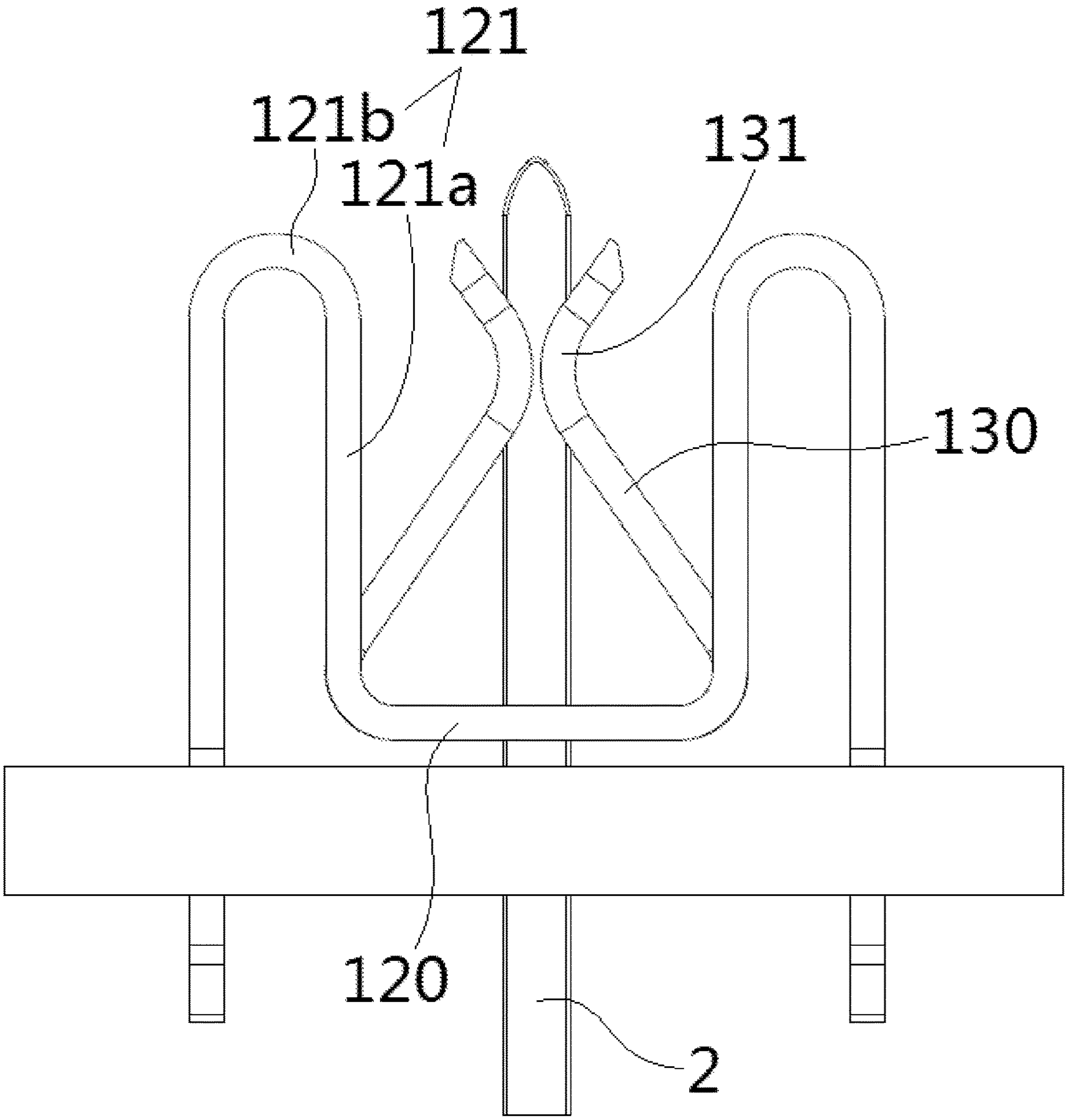
FIG. 4 is a side view of the electrical connection assembly, with the mating terminal in a correct insertion position aligned with a clamping portion of the conductive terminal.

The conductive terminal 1, as shown in FIGS. 2 to 4, includes a fixing portion 11, a floating portion 12, and an elastic clip 13. The fixing portion 11 is used for being mechanically fixed and electrically connected to the circuit board 3. The floating portion 12 is elastically connected to the fixing portion 11 and can float relative to the fixing portion 11. The elastic clip 13 is connected to the floating portion 12 and has a clamping portion **13*a*. The clamping portion 13*a* is used for clamping and electrically contacting the inserted mating terminal 2**.

Figure 5:
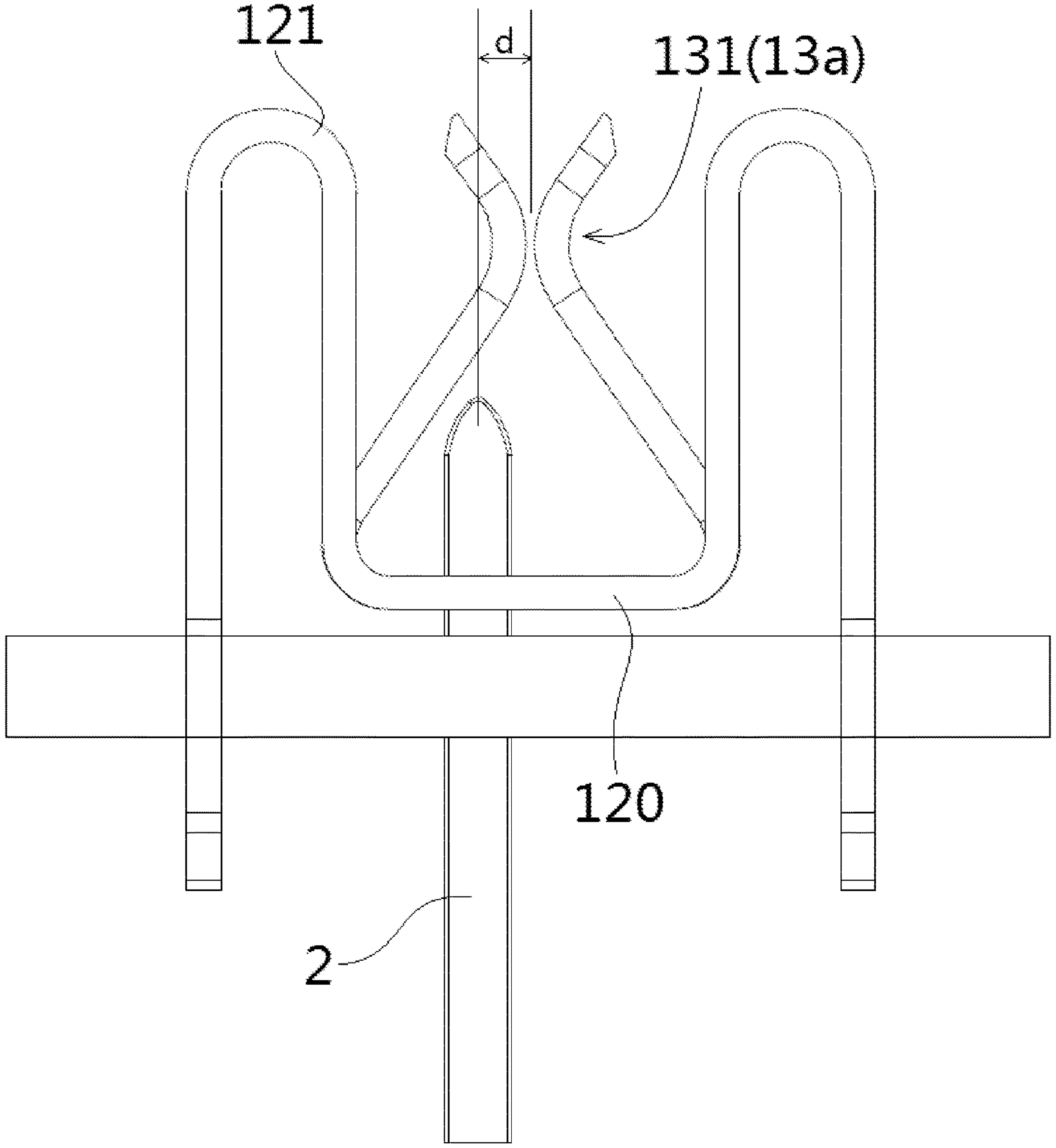
FIG. 5 is a side view of the electrical connection assembly, with the mating terminal in an offset position that is not aligned with the clamping portion of the conductive terminal.
Figure 6:
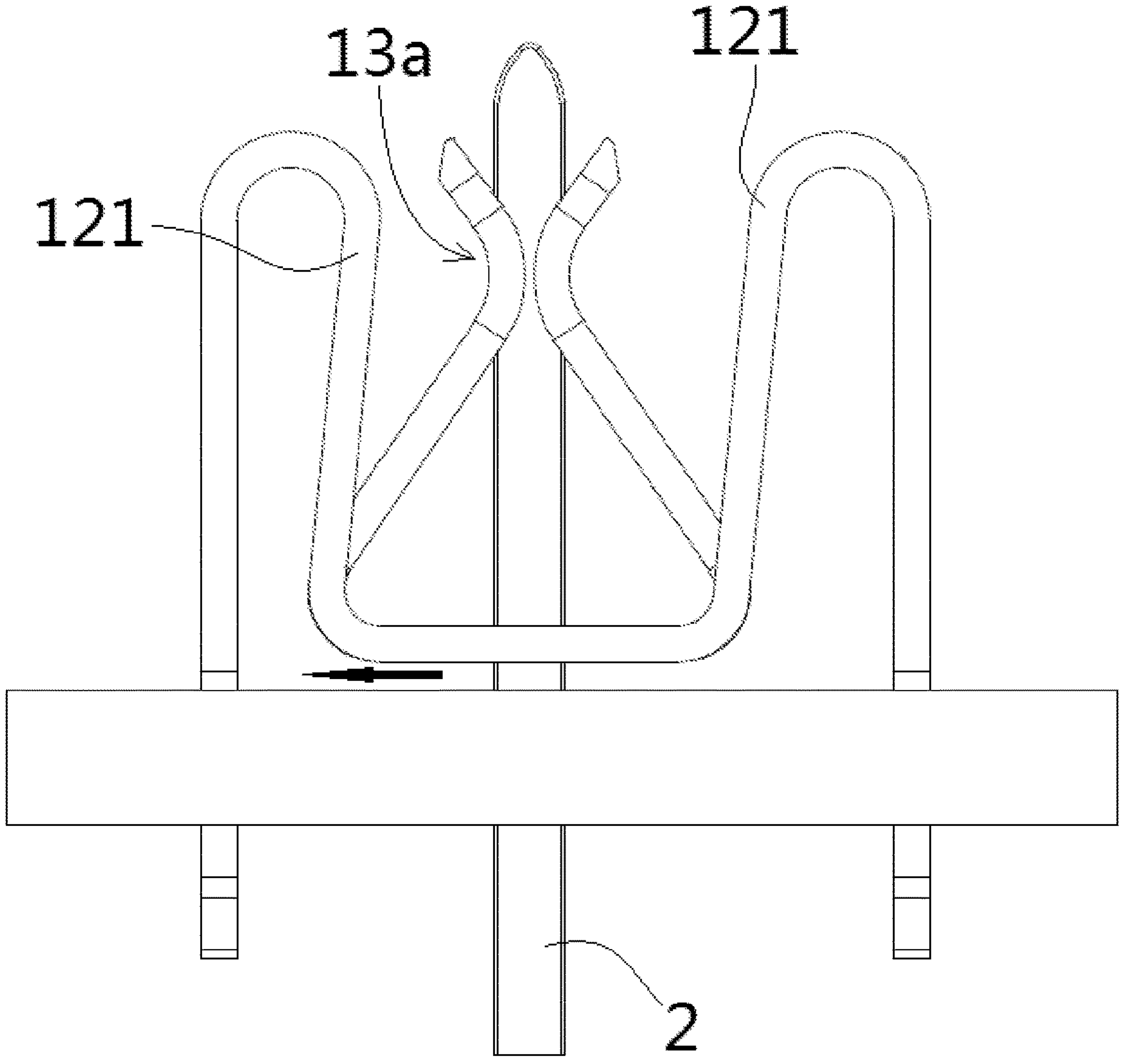
FIG. 6 is a side view of the electrical connection assembly, with the mating terminal inserted into the clamping portion of the conductive terminal.

When the mating terminal 2 to be inserted is offset from the clamping portion **13*a*, for example, in the embodiment shown in FIG. 5, an offset amount in a first direction X between the mating terminal 2 to be inserted and the clamping portion 13*a* of the conductive terminal 1 is d. At this time, as shown in FIGS. 5 and 6, the floating portion 12 can be moved under the drive of the inserted mating terminal 2 to adjust the clamping portion 13*a* to a position aligned with the mating terminal 2, thereby ensuring reliable electrical contact between the mating terminal 2 and the clamping portion 13*a***.

The floating portion 12 can float in the first direction X relative to the fixing portion 11, and the mating terminal 2 is inserted into the clamping portion **13*a* in the second direction Z perpendicular to the first direction X. When the mating terminal 2 to be inserted is offset from the clamping portion 13*a* by a predetermined distance in the first direction, as shown in FIG. 5, the floating portion 12 can be moved in the first direction under the drive of the inserted mating terminal 2 to eliminate the offset amount d in the first direction between the mating terminal 2 and the clamping portion 13*a***.

As shown in FIGS. 3 to 5, the floating portion 12 includes a base plate 120 and an elastic connecting portion 121. The elastic connecting portion 121 is connected between the base plate 120 and the fixing portion 11. The elastic connecting portion 121 can be elastically deformed in the first direction X, enabling the base plate 120 to float in the first direction X relative to the fixing portion 11. The elastic clip 13 is connected to the base plate 120 to be able to float with the base plate 120.

As shown in FIG. 3, the fixing portion 11 includes a side plate 110 and a pin 111. The pin 111 is connected to the side plate 110. The pin 111 is used for being inserted and fixed into a conductive hole 311 on the circuit board 3, and the elastic connecting portion 121 is connected to the side plate 110 so that the floating portion 12 is suspended on the side plate 110. The surface of the side plate 110 is perpendicular to the first direction X, and the surface of the base plate 120 is perpendicular to the second direction Z.

As shown in FIG. 3, in the illustrated embodiment, the fixing portion 11 includes a pair of side plates 110 arranged parallel to each other, and the pin 111 is connected to one of the two side edges of the side plate 110 opposite to each other in the second direction Z and extends along the second direction Z. The two sides of the base plate 120 opposite to each other in the first direction X are respectively connected to the other of the two side edges of the side plate 110 opposite to each other in the second direction Z through the elastic connecting portion 121. The floating portion 12 includes two pairs of elastic connecting portions 121, which are respectively connected to opposite sides of the base plate 120 in the first direction X.

The elastic clip 13, as shown in FIGS. 2 and 3, includes a pair of elastic cantilevers 130. The pair of elastic cantilevers 130 are respectively connected to opposite sides of the base plate 120 in the first direction X. The elastic cantilever 130 has an arc-shaped bending portion 131 located at its free end, and the arc-shaped bending portions 131 of the pair of elastic cantilevers 130 are adjacent to each other to form the clamping portion 13*a*.

As shown in FIG. 3, in the illustrated embodiment, an opening 120*a* allowing the mating terminal 2 to pass through is formed in the middle area of the base plate 120, and the clamping portion 13*a* faces the opening 120*a* in the second direction Z.

In the illustrated embodiment, the fixed end of the elastic cantilever 130 is connected to the middle of the side edge of the base plate 120 and is located between a corresponding pair of elastic connecting portions 121.

As shown in FIG. 3, the elastic connecting portion 121 includes a first connecting arm 121*a* and a second connecting arm 121*b*. The first connecting arm 121*a* extends in a straight line in the second direction Z. The second connecting arm 121*b* is bent into an arc. One end of the second connecting arm 121*b* is connected to the side plate 110, the other end of the second connecting arm 121*b* is connected to one end of the first connecting arm 121*a*, and the other end of the first connecting arm 121*a* is connected to the base plate 120.

An electrical connection assembly is also disclosed, which includes a circuit board 3 and the aforementioned conductive terminal 1, as shown in FIGS. 1 and 2. The fixing portion 11 of the conductive terminal 1 is mechanically fixed and electrically connected to the circuit board 3, and the floating portion 12 of the conductive terminal 1 is suspended on the circuit board 3 through the fixing portion 11 and is not in contact with the circuit board 3.

A conductive hole 311 is formed on the circuit board 3, and a pin 111 is formed on the fixing portion 11. The pin 111 is inserted into the conductive hole 311 to mechanically fix and electrically connect the conductive terminal 1 to the circuit board 3, as shown in FIG. 1.

In an embodiment, a conductive soldering pad is formed on the circuit board 3, a soldering portion is formed on the fixing portion 11, and the soldering portion is welded to the soldering pad to mechanically fix and electrically connect the conductive terminal 1 to the circuit board 3.

The electrical connection assembly further includes a mating terminal 2 inserted into the clamping portion 13*a* of the conductive terminal 1 to electrically connect with the conductive terminal 1, as shown in FIGS. 1 and 4 to 6. The circuit board 3 has first and second sides opposite to each other in its thickness direction, and the conductive terminal 1 is installed on the first side of the circuit board 3. A through hole 32 is formed on the circuit board 3 to allow the mating terminal 2 to pass through. The mating terminal 2 passes through the through hole 32 on the circuit board 3 from the second side of the circuit board 3 and is inserted into the clamping portion 13*a*.

It should be appreciated for those skilled in this art that the above embodiments are intended to be illustrative, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A conductive terminal, comprising:

a fixing portion mechanically fixing and electrically connecting to a circuit board;

a floating portion elastically connected to the fixing portion and capable of moving relative to the fixing portion; and an elastic clip connected to the floating portion and having a clamping portion clamping and electrically contacting a mating terminal inserted into the clamping portion, the floating portion is movable under a drive of the mating terminal when the mating terminal is inserted offset into the clamping portion to adjust the clamping portion to a position aligned with the mating terminal.

2. The conductive terminal of claim 1, wherein the floating portion is movable in a first direction relative to the fixing portion, and the mating terminal is inserted into the clamping portion in a second direction perpendicular to the first direction.

3. The conductive terminal of claim 1, wherein, when the mating terminal is inserted offset from the clamping portion by a predetermined distance in the first direction, the floating portion is movable in the first direction under the drive of the mating terminal to eliminate an offset in the first direction between the mating terminal and the clamping portion.

4. The conductive terminal of claim 3, wherein the floating portion includes a base plate and an elastic connecting portion connecting the base plate and the fixing portion, the elastic connecting portion is elastically deformable in the first direction so that the base plate is movable in the first direction relative to the fixing portion, the elastic clip is connected to the base plate and movable with the base plate.

5. The conductive terminal of claim 4, wherein the fixing portion includes a side plate and a pin connected to the side plate, the pin is inserted and fixed into a conductive hole on the circuit board, the elastic connecting portion is connected to the side plate and the floating portion is suspended on the side plate.

6. The conductive terminal of claim 5, wherein a surface of the side plate is perpendicular to the first direction, and a surface of the base plate is perpendicular to the second direction.

7. The conductive terminal of claim 6, wherein the fixing portion has a pair of side plates arranged parallel to each other, the pin is connected to one of a pair of side edges of the side plates opposite to each other in the second direction and extends along the second direction.

8. The conductive terminal of claim 7, wherein a pair of sides of the base plate opposite to each other in the first direction are connected to the other of the pair of side edges of the side plate opposite to each other in the second direction through the elastic connecting portion.

9. The conductive terminal of claim 8, wherein the floating portion has two pairs of elastic connecting portions connected to the pair of sides of the base plate opposite to each other in the first direction.

10. The conductive terminal of claim 9, wherein the elastic clip has a pair of elastic cantilevers connected to the pair of sides of the base plate opposite to each other in the first direction.

11. The conductive terminal of claim 10, wherein each of the elastic cantilevers has an arc-shaped bending portion at a free end, the arc-shaped bending portions of the pair of elastic cantilevers are adjacent to each other to form the clamping portion.

12. The conductive terminal of claim 11, wherein an opening is formed in a middle area of the base plate to allow the mating terminal to pass through, the clamping portion faces the opening in the second direction.

13. The conductive terminal of claim 11, wherein a fixed end of the elastic cantilever is connected to a middle position of a side edge of the base plate and is located between a corresponding pair of elastic connecting portions.

14. The conductive terminal of claim 5, wherein the elastic connecting portion includes a first connecting arm extending in a straight line along the second direction and a second connecting arm that is bent into an arc.

15. The conductive terminal of claim 14, wherein a first end of the second connecting arm is connected to the side plate and a second end of the second connecting arm is connected to a first end of the first connecting arm, a second end of the first connecting arm is connected to the base plate.

16. An electrical connection assembly, comprising:

a circuit board; and a conductive terminal including:

a fixing portion mechanically fixing and electrically connecting to the circuit board;

a floating portion elastically connected to the fixing portion and capable of moving relative to the fixing portion, the floating portion is suspended on the circuit board through the fixing portion without contact with the circuit board; and an elastic clip connected to the floating portion and having a clamping portion clamping and electrically contacting a mating terminal inserted into the clamping portion, the floating portion is movable under a drive of the mating terminal when the mating terminal is inserted offset into the clamping portion to adjust the clamping portion to a position aligned with the mating terminal.

17. The electrical connection assembly of claim 16, wherein a conductive hole is formed on the circuit board and a pin is formed on the fixing portion, the pin is inserted into the conductive hole to mechanically fix and electrically connect the conductive terminal to the circuit board.

18. The electrical connection assembly of claim 16, wherein a conductive soldering pad is formed on the circuit board, and a soldering portion is formed on the fixing portion, the soldering portion is welded to the conductive soldering pad to mechanically fix and electrically connect the conductive terminal to the circuit board.

19. The electrical connection assembly of claim 16, further comprising a mating terminal inserted into the clamping portion of the conductive terminal to electrically connect with the conductive terminal.

20. The electrical connection assembly of claim 19, wherein the circuit board has a first side and a second side opposite thereto in a thickness direction, the conductive terminal is installed on the first side of the circuit board, a through hole is formed on the circuit board to allow the mating terminal to pass through, the mating terminal passes through the through hole on the circuit board from the second side of the circuit board and is inserted into the clamping portion.

* * * * *